US008236084B2

(12) United States Patent
Fischer et al.

(10) Patent No.: US 8,236,084 B2
(45) Date of Patent: Aug. 7, 2012

(54) CERAMIC RADIAL WALL FLOW PARTICULATE FILTER

(75) Inventors: Michael Fischer, Corning, NY (US); Michael Thomas Gallagher, Corning, NY (US); Keith Leonard House, Corning, NY (US); Thomas Dale Ketcham, Big Flats, NY (US); Christopher John Malarkey, Corning, NY (US); John Stephen Rosettie, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/857,174

(22) Filed: Aug. 16, 2010

(65) Prior Publication Data
US 2011/0041469 A1 Feb. 24, 2011

Related U.S. Application Data

(60) Provisional application No. 61/234,758, filed on Aug. 18, 2009.

(51) Int. Cl.
*B01D 39/06* (2006.01)
(52) U.S. Cl. ............ 55/523; 55/498; 60/311; 422/177
(58) Field of Classification Search .......... 55/498, 55/523; 422/177; 60/311; 428/116–118; 502/527.19–527.22
See application file for complete search history.

(56) References Cited

U.S. PATENT DOCUMENTS

| | | | | |
|---|---|---|---|---|
| 4,072,616 A | * | 2/1978 | Rohlig | 210/493.5 |
| 5,250,094 A | * | 10/1993 | Chung et al. | 55/523 |
| 5,611,831 A | * | 3/1997 | Matsuoka et al. | 55/486 |
| 5,620,666 A | * | 4/1997 | Usui | 422/171 |
| 5,682,740 A | | 11/1997 | Kawamura | 60/297 |
| 5,737,839 A | * | 4/1998 | Whittenberger et al. | 29/890 |
| 5,820,646 A | | 10/1998 | Gillingham et al. | 55/488 |
| 5,911,883 A | * | 6/1999 | Anderson | 210/679 |
| 6,096,212 A | | 8/2000 | Quick et al. | 210/493.2 |
| 6,544,310 B2 | | 4/2003 | Badeau et al. | 55/385.3 |
| 6,841,135 B2 | * | 1/2005 | Matsuoka | 422/180 |
| 7,029,634 B2 | * | 4/2006 | Sherwood, Jr. | 422/177 |
| 7,044,992 B2 | | 5/2006 | Frankle et al. | 55/523 |
| 7,125,490 B2 | * | 10/2006 | Clendenning et al. | 210/493.4 |
| 7,229,598 B2 | * | 6/2007 | Takahashi et al. | 422/180 |
| 7,252,809 B2 | | 8/2007 | Bruck et al. | 422/181 |
| 7,690,113 B2 | * | 4/2010 | Althofer | 29/890.039 |
| 2002/0090324 A1 | * | 7/2002 | Badeau et al. | 422/171 |
| 2005/0095180 A1 | * | 5/2005 | Wieres | 422/180 |
| 2008/0141638 A1 | | 6/2008 | Linhart et al. | 55/520 |
| 2008/0202084 A1 | | 8/2008 | Lynch et al. | 55/493 |
| 2009/0019823 A1 | | 1/2009 | Juliar et al. | 55/472 |

FOREIGN PATENT DOCUMENTS

| | | |
|---|---|---|
| DE | 101 28 936 | 1/2003 |
| WO | 97/40910 | 11/1997 |
| WO | 2005/059322 | 6/2005 |
| WO | 2007/045621 | 4/2007 |
| WO | 2008/157487 | 12/2008 |

* cited by examiner

*Primary Examiner* — Duane Smith
*Assistant Examiner* — Thomas McKenzie
(74) *Attorney, Agent, or Firm* — Joseph M. Homa; Matthew J. Mason

(57) ABSTRACT

The present disclosure relates to radial wall flow particulate filters comprised of ceramic material. The filters include a filter body that has a plurality of adjacent troughs circumferentially arranged around a longitudinal axis.

18 Claims, 18 Drawing Sheets

CERAMIC RADIAL WALL FLOW PARTICULATE FILTER

CROSS-REFERENCE TO RELATED APPLICATIONS

This application claims the benefit of, and priority to U.S. Provisional Patent Application No. 61/234,758 filed on Aug. 18, 2009 entitled, "Ceramic Radial Wall Flow Particulate Filter", the content of which is relied upon and incorporated herein by reference in its entirety.

FIELD OF THE DISCLOSURE

The present disclosure relates to particulate filters for filtering gas streams, and more particularly to wall flow particulate filters comprised of ceramic and suitable for appreciable radial wall flow.

BACKGROUND

Ceramic honeycomb substrates and honeycomb filters for mobile exhaust systems are known. Square and rectangular honeycomb cells are generally made via extrusion. Particulate emissions in exhaust gas from diesel engines are typically handled by wall flow honeycombs with low thermal expansion materials such as cordierite or aluminum titanate based materials. The commercial products have generally straight, axially aligned channels with uniform cross-sections with plugs in alternating checker board patterns on the ends of the honeycomb pieces to force the exhaust gas through the cell channel walls.

SUMMARY

In accordance with the detailed description and various exemplary embodiments described herein, the present disclosure relates to particulate filters comprising a ceramic cylindrical filter body having a central longitudinal axis, the filter body comprising a plurality of adjacent troughs circumferentially arranged around the longitudinal axis, each trough having an inner surface and an outer surface, each trough comprising a pair of walls extending generally radially, or generally normal to the outer surface of the filter body, each trough having an open end and a closed end disposed opposite the open end, the closed end being disposed radially, or normal to the outer surface, inward of the open end. The particulate filter is suitable for filtering exhaust streams from, for example, engines, and could serve as diesel particulate filters, gasoline particulate filters, or other types of filters and in various applications. In addition to axial component flow, embodiments of the particulate filters disclosed herein have appreciable radial flow components as compared to known honeycomb wall flow filters.

BRIEF DESCRIPTION OF THE DRAWINGS

The accompanying drawings are included to provide a further understanding of the invention, and are incorporated in and constitute a part of this specification. The drawings are not intended to be restrictive of the invention as claimed, but rather are provided to illustrate embodiments of the invention and, together with the description, serve to explain the principles of the invention.

DETAILED DESCRIPTION

Figure 1:
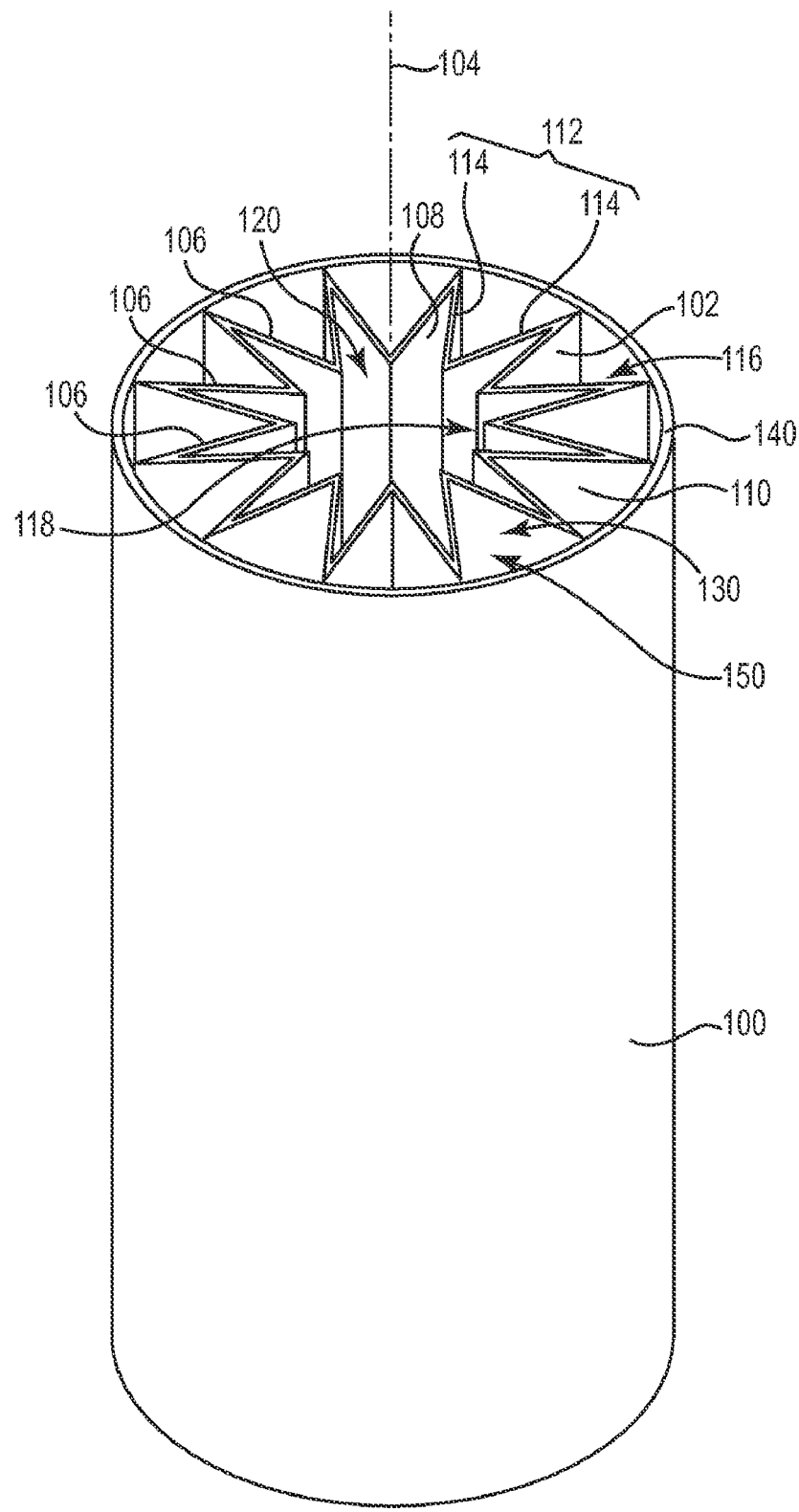
FIG. 1 is an isometric schematic view of an embodiment of a filter disclosed herein, shown without end caps.

It is to be understood that both the foregoing general description and the following detailed description are exemplary and explanatory only, and are not restrictive of the invention, as claimed. Other embodiments of the invention will be apparent to those skilled in the art from consideration of the specification and practice of the invention disclosed herein.

The particulate filters disclosed herein provide enhanced radial flow through porous ceramic walls, and can be referred to as radial wall flow particulate filters. The particulate filters can be employed to remove particulate material from an exhaust stream, such as a combustion engine exhaust stream.

FIGS. 1-4 illustrate an embodiment of the particulate filters disclosed herein. The particulate filter 100 comprises a ceramic cylindrical filter body 102 having a central longitudinal axis 104, the filter body comprising a plurality of adjacent troughs 106 circumferentially arranged around the longitudinal axis 104, each trough 106 having an inner surface 108 and an outer surface 110, each trough 106 comprising a pair 112 of walls 114 extending generally radially, each trough 106 having an open end 116 and a closed end 118 disposed opposite the open end 116, the closed end 118 being disposed radially inward of the open end 116, wherein at the open ends 116 of the troughs 106 the walls 112 of immediately adjacent troughs are joined, the outer surface 110 of the troughs 106 defining a common interior cavity 120. In this embodiment, the troughs 106 (and more particularly the closed ends 118 of the troughs 106) are spaced away from the longitudinal axis 104.

In some embodiments, such as illustrated in FIGS. 1-4, the cylindrical filter body 102 has a generally circular transverse cross-sectional shape, although other embodiments may have other cross-sectional shapes such as square, rectangular, triangular, oval, or hexagonal. In some embodiments, such as illustrated in FIGS. 1-4, the cylindrical filter body 102 is a right circular cylindrical filter body.

In the embodiment of FIGS. 1-4, the walls 114 of immediately adjacent troughs 106 intersect at the open ends 116 of the troughs 106. The walls 114 of at least one trough 106 at the open end 116 terminate at substantially the same outer radius RO1, and the closed end 118 of at least one trough 106 is disposed at substantially the same inner radius RI1. The walls 114 of each respective trough 106 at the open end 116 can terminate at substantially the same outer radius RO1; the closed end 118 of each respective trough 106 can be disposed at substantially the same inner radius RI1. Thus, in this embodiment, the walls 114 of all troughs 106 at the open end 116 terminate at substantially the same outer radius RO1, and the closed ends 118 of all troughs 106 are disposed at substantially the same inner radius RI1. The walls 114 of each trough 106 intersect at the closed end 118.

Figure 3:
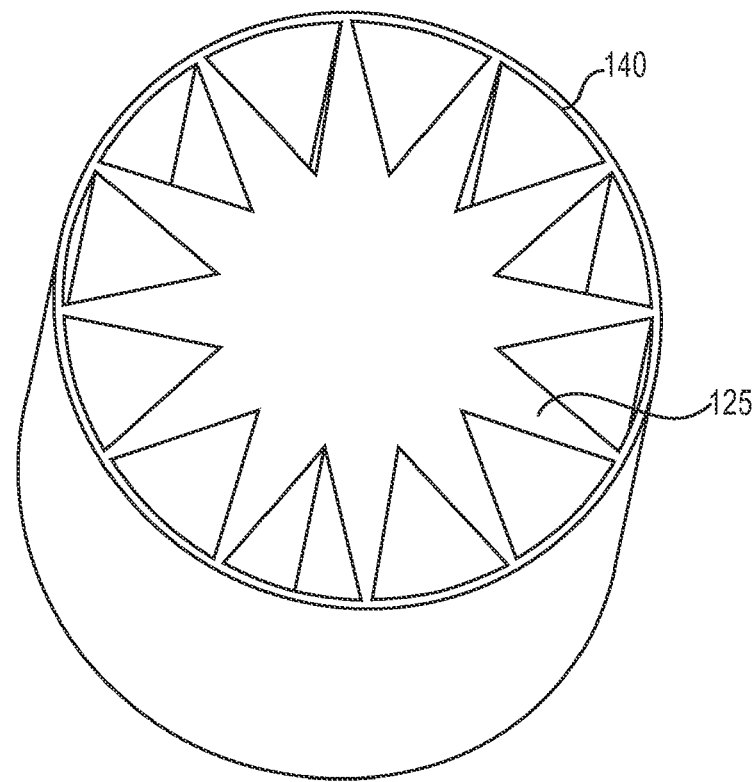
FIG. 3 is an isometric schematic view of one end of the filter of FIG. 1 showing an endcap.
Figure 4:
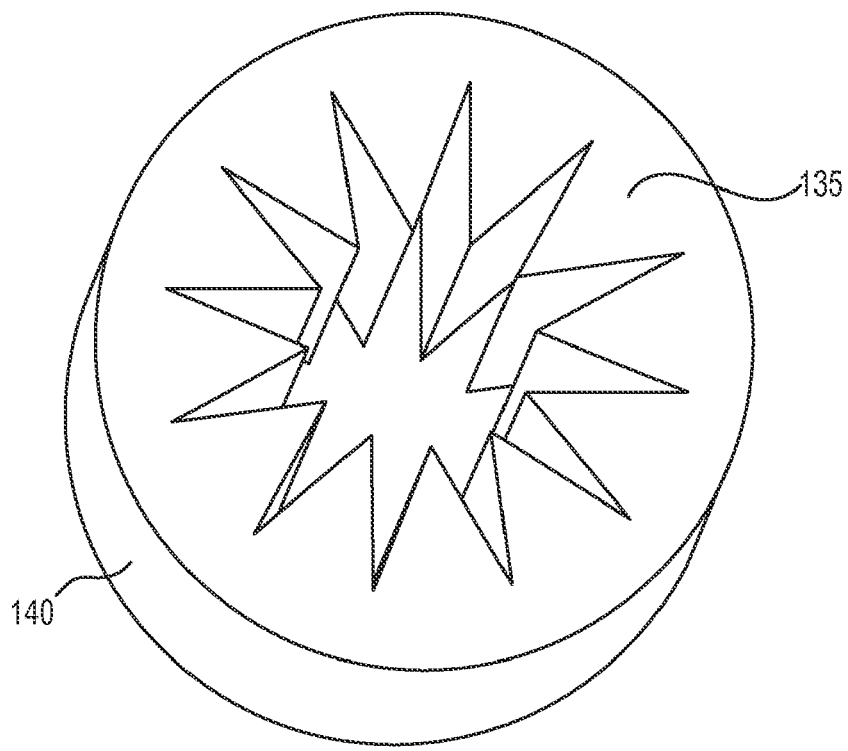
FIG. 4 is an isometric schematic view of the other end of the filter of FIGS. 1-3 showing the other endcap.

Referring to FIG. 3, the particulate filter 100 can further comprise an inner longitudinal end cap 125 that contactingly covers one longitudinal end of the common interior cavity 120. In some embodiments the inner longitudinal end cap 125 is comprised of porous ceramic; in other embodiments, the inner longitudinal end cap 125 is comprised of a non-porous material that inhibits the flow of gas therethrough.

Figure 2:
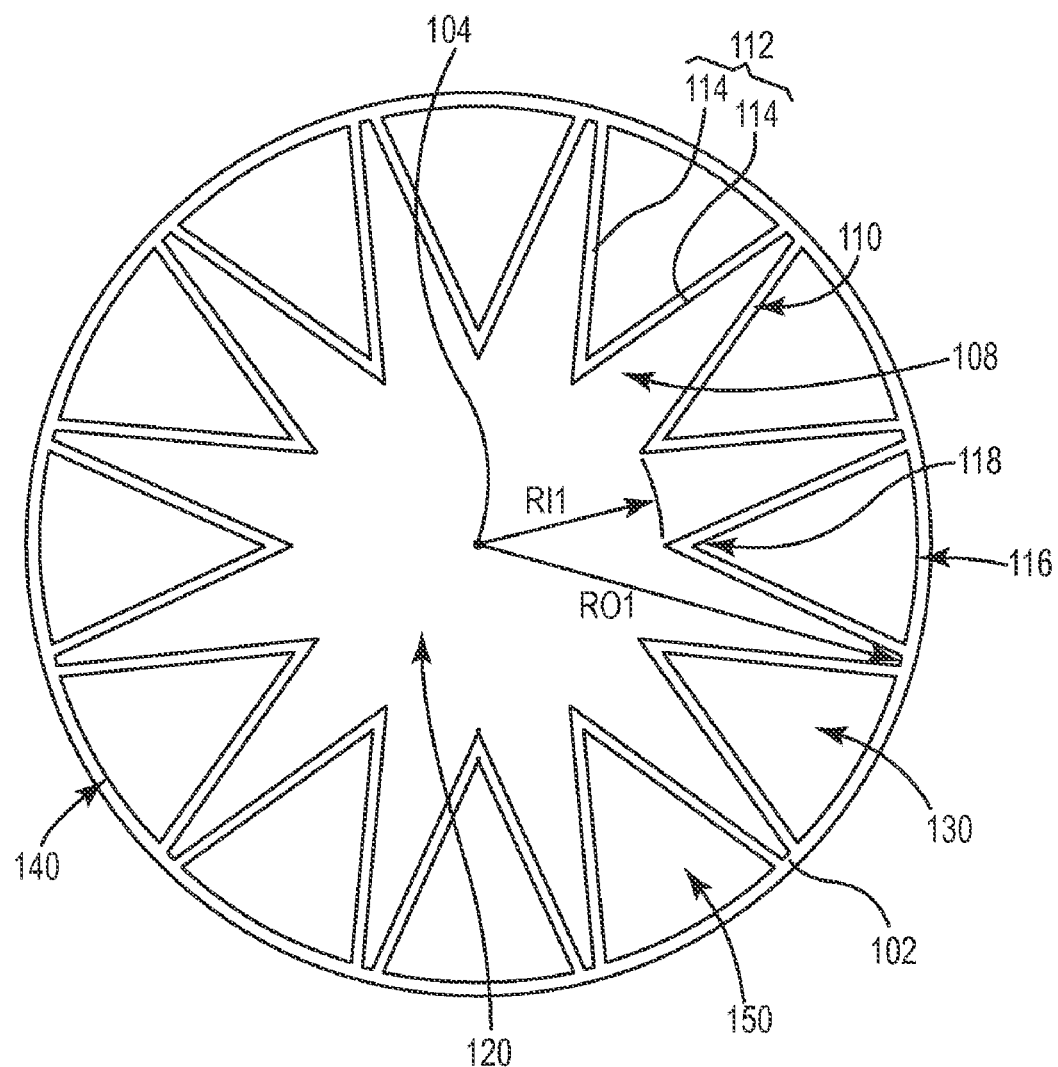
FIG. 2 is an end view of FIG. 1.

As seen in FIGS. 2-3, the inner surface 108 of each trough 106 defines a respective outer cavity 130. As seen in the embodiment shown in FIG. 4, the particulate filter 100 can further comprise an outer longitudinal end cap 135 that contactingly covers one longitudinal end of the outer cavities 130. In some embodiments the outer longitudinal end cap 135 is comprised of porous ceramic; in other embodiments, the outer longitudinal end cap 135 is comprised of a non-porous material that inhibits the flow of gas therethrough.

Back pressure through a porous ceramic filter 100 having the general configuration as represented in FIGS. 1-4 was estimated via computer simulation for various geometries. The configuration included all troughs 106 with open ends 116 terminating at substantially the same outer radius RO1, or outer diameter OD=2*outer radius, and with closed ends 118 of all troughs 106 being disposed at substantially the same inner radius RI1, or inner diameter ID=2*inner radius, the filter body 102 having an overall longitudinal length L, and the filter body 102 having "n" number of troughs 106. Back pressure was determined for various combinations of OD=4.16" to 5.66", ID=1.5" to 3", L=6" to 8", and total space velocity for air flow of 30K to 75K hr$^{-1}$ from the interior cavity 120 and radially through the troughs 106.

Figure 5:
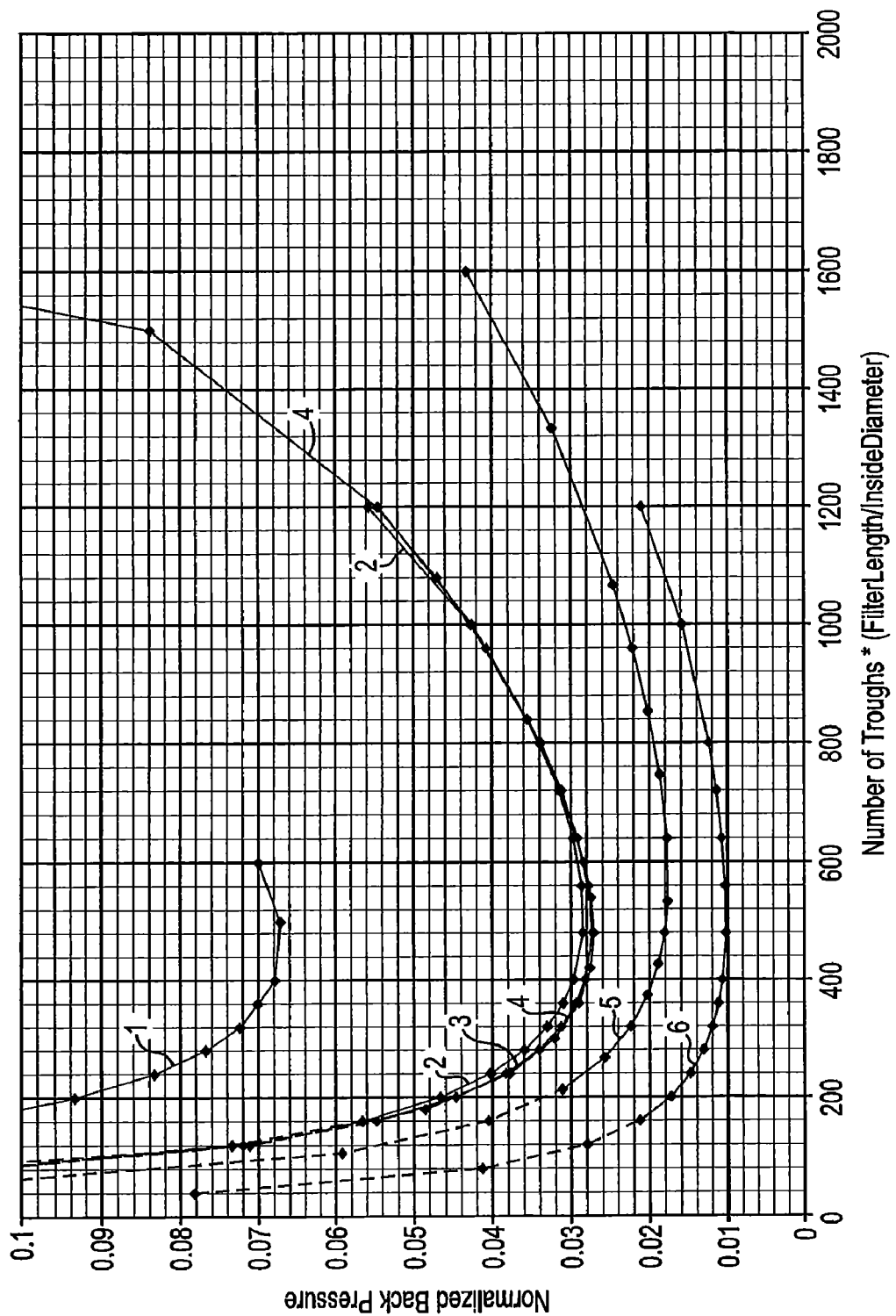
FIG. 5 is a schematic illustration of the variation on backpressure with number of troughs, inside diameter of the troughs, and overall filter longitudinal length.

FIG. 5. illustrates modeled results showing normalized back pressure versus the quantity n*L/ID for various filter body geometries (Curves 1-6 corresponding to Examples 1-6), of various diameters and lengths, made of a porous cordierite composition having mean pore size of about 10 microns and 50% porosity, and at various flow rates, as further described in Table 1.

TABLE 1

| Curve | Outside Diameter (inches) | Inside Diameter (inches) | Filter Length (inches) | Flow rate Space Velocity (1/hr) |
|---|---|---|---|---|
| 1 | 4.16 | 3.0 | 6 | 30,000 |
| 2 | 4.16 | 1.5 | 6 | 30,000 |
| 3 | 5.66 | 1.5 | 6 | 30,000 |
| 4 | 4.16 | 1.0 | 6 | 30,000 |
| 5 | 4.16 | 1.5 | 8 | 30,000 |
| 6 | 4.16 | 1.5 | 6 | 75,000 |

In some embodiments, lower backpressure is advantageously low for values of n*L/ID between 300 and 900, and particularly for inner radius RI1 between 0.5 and 2 inches, outer radius RO1 between 2 and 3 inches, or L between 6 and 8 inches, or a combination thereof; in other embodiments, lower backpressure is advantageously low for values of n*L/ID between 400 and 600, and particularly for inner radius RI1 between 0.5 and 2 inches, outer radius RO1 between 2 and 3 inches, or L between 6 and 8 inches, or a combination thereof. For other porous ceramic compositions, a difference in the microstructure may cause the curves in FIG. 5 to shift up or down (i.e. absolute value of backpressure changes), but the impact on number of troughs (left or right) should be small.

Referring again to FIGS. 1-4, the filter body 102 can further comprise an outer peripheral wall 140 surrounding the troughs 106. In the embodiment shown, the outer peripheral wall 140 contactingly covers the open ends 116 of the troughs 106, and moreover the outer peripheral wall 140 contactingly covers the open ends 116 of the troughs 106 along substantially the entire length L of the filter body 102. As seen in the embodiment of FIGS. 1-4, the inner surface 108 of each trough 106 defines an outer cavity 130, and the outer peripheral wall 140 separates the outer cavities 130 from each other. The outer peripheral wall 140 and pairs 112 of walls 114 of the troughs 106 define respective outer channels 150.

Figure 6:
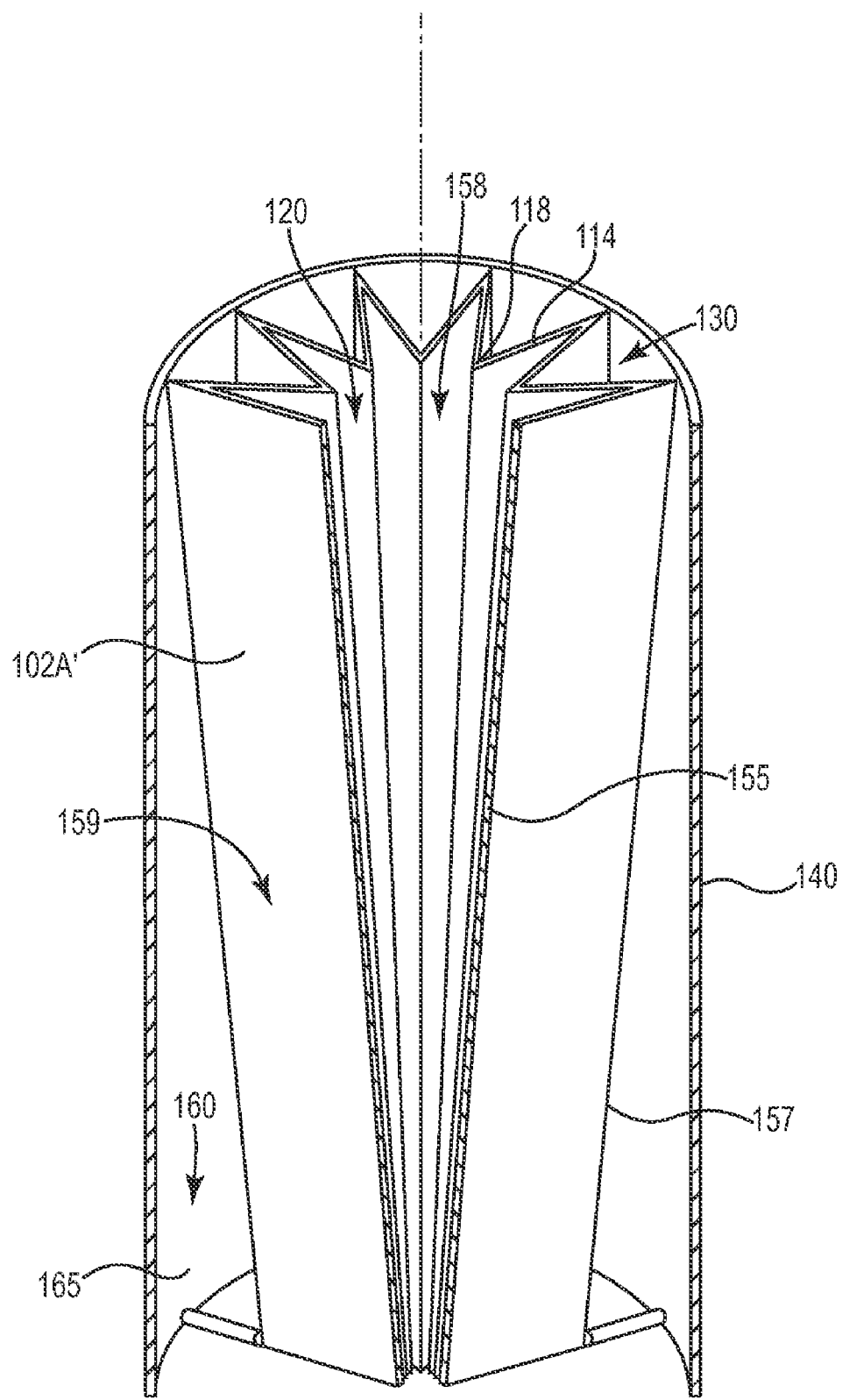
FIG. 6 is a cutaway isometric schematic view of another embodiment disclosed herein.

In other embodiments, such as illustrated by FIG. 6, the outer peripheral wall 140 of the cylindrical filter body 102A is spaced away from at least a portion of at least some of the open ends 116 of the troughs 106, thereby defining an outer channel 150 surrounding at least a portion of the troughs 106. As illustrated by the embodiment of FIG. 6, the walls 114 of the troughs 106 can vary longitudinally.

For example, as seen in FIG. 6, the radial positions of the walls 114 at the closed ends 118 of the troughs 106 can vary longitudinally to form an inner longitudinal taper 155, or the radial positions of the walls 114 at the open ends 116 of the troughs 106 vary longitudinally to form an outer longitudinal taper 157, or both. Such embodiments can allow more axial as well as radial flow through the filter body 102A'; for example, FIG. 6 shows axial gas flow 158 into the common interior cavity 120, radial and axial flow 159 through the walls 114 of the troughs 106, and axial flow 160 through the common outer cavity 165 comprised of the outer cavities 130 of the troughs 106 and the annular space 166 between the outer peripheral wall 140 and the walls 114 of the troughs 106.

Figure 7:
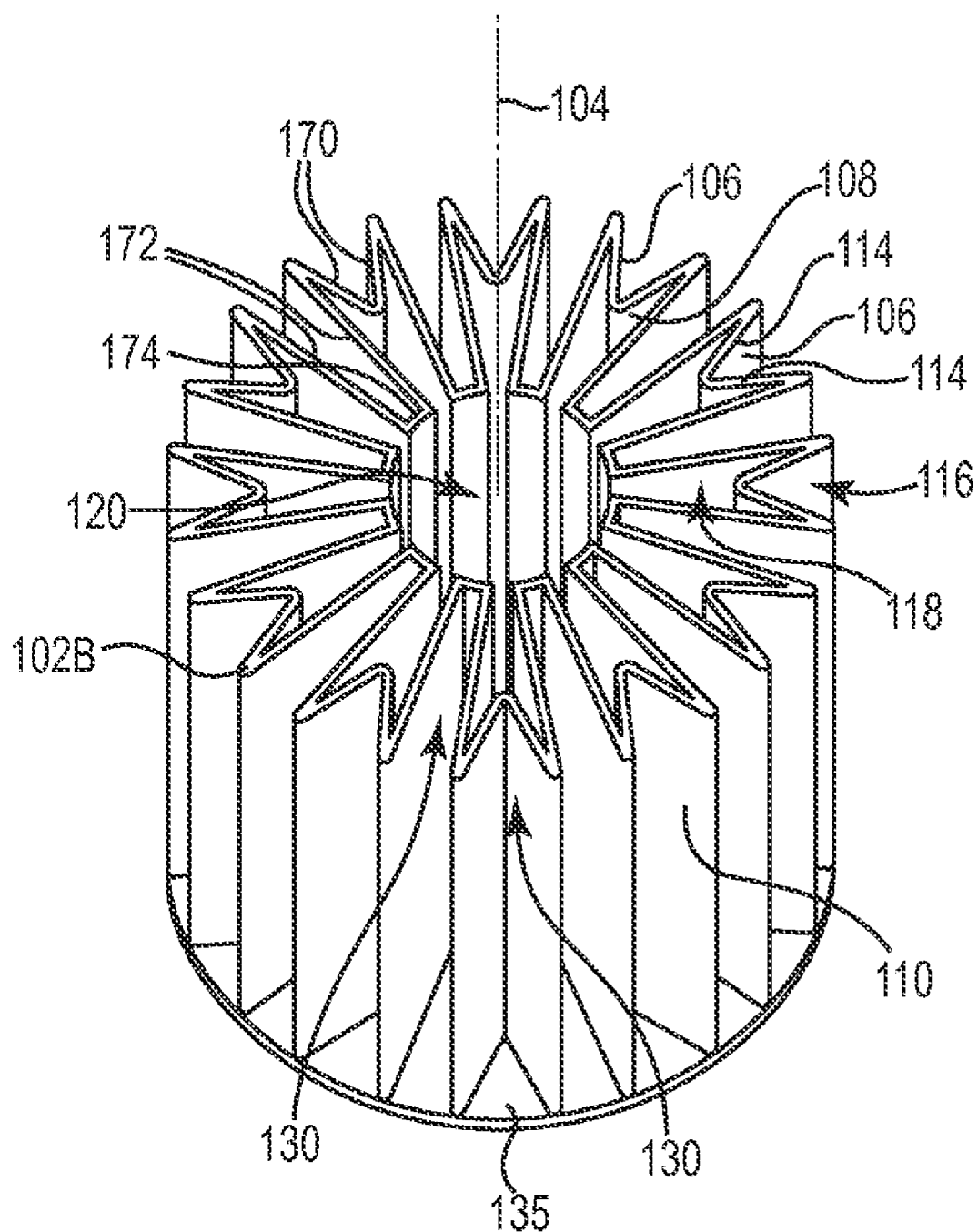
FIG. 7 is an isometric schematic view of yet another embodiment disclosed herein capped on one end.
Figure 8:
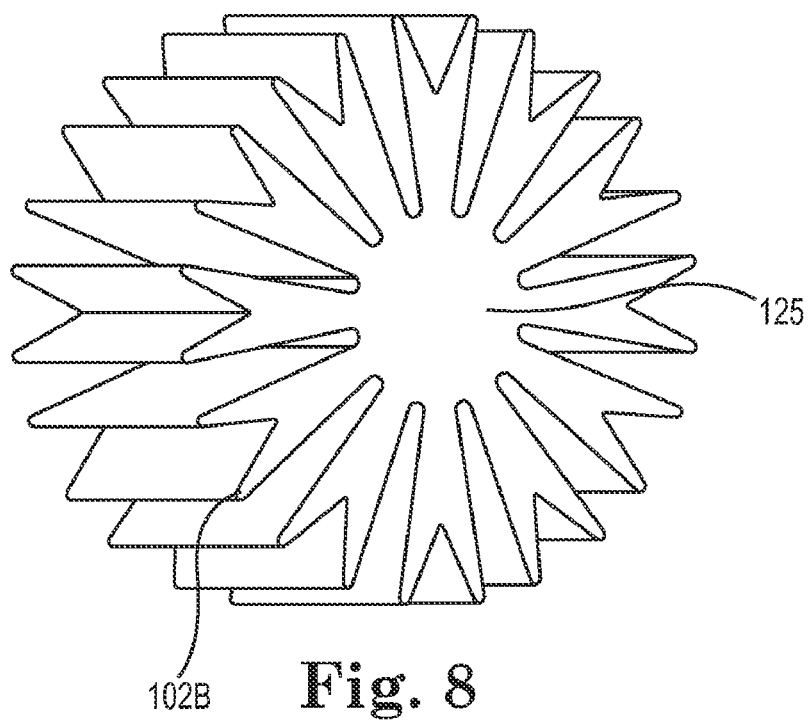
FIG. 8 is an isometric schematic view of the filter of FIG. 7 showing an opposite end capped.
Figure 9:
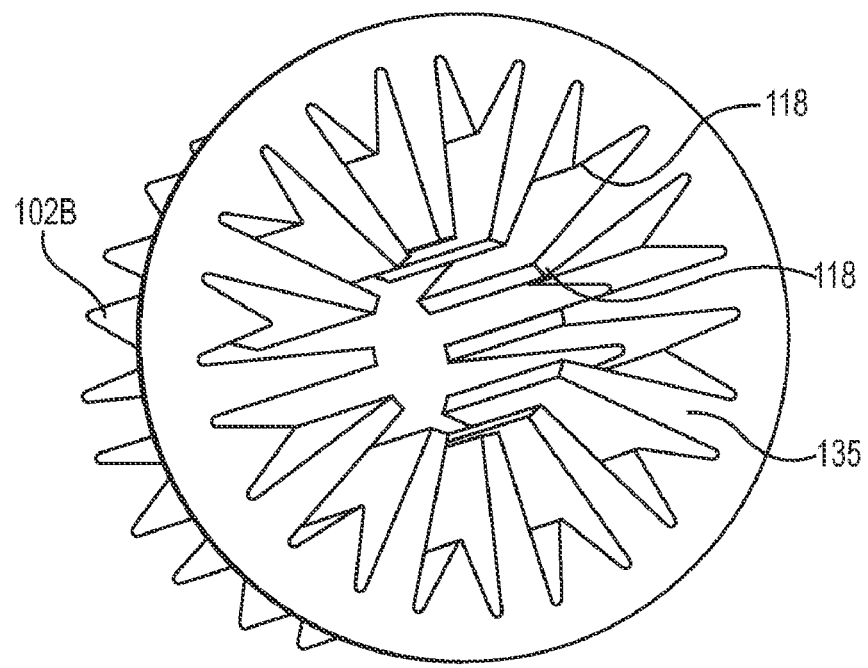
FIG. 9 is another isometric schematic view of the filter of FIG. 7 with both ends capped.

FIGS. 7-9 illustrate another embodiment of the particulate filters disclosed herein. The particulate filter comprises a ceramic cylindrical filter body 102B having a central longitudinal axis 104, the filter body 102B comprising a plurality of adjacent troughs 106 circumferentially arranged around the longitudinal axis 104, each trough 106 having an inner surface 108 and an outer surface 110, each trough 106 comprising a pair 112 of walls 114 extending generally radially, each trough 106 having an open end 116 and a closed end 118 disposed opposite the open end, the closed end 118 being disposed radially inward of the open end 116, wherein at the open ends 116 of the troughs 106 the walls 114 of immediately adjacent troughs 106 are joined, the outer surface 110 of the troughs 106 defining a common interior cavity 120. In this embodiment, the troughs 106 are spaced away from the longitudinal axis 104.

As seen in FIGS. 7-9, the troughs 106 comprise first and second subsets of troughs 170, 172, the closed ends 118 of the troughs 106 of the first subset 170 being disposed farther away from the central longitudinal axis 104 than the closed ends 118 of the troughs 106 of the second subset 172. In at least the first subset 170 of troughs 106, each of the pairs 112 of walls 114 intersect at respective closed ends 118, and the walls 112 in at least the first subset of troughs 170 are disposed in a V-shape. In at least a second subset 172 of troughs, the troughs 106 each comprise a respective inner circumferential wall 174 disposed at the closed ends 118, the inner circumferential walls 174 extending generally circumferentially, wherein each pair 112 of walls 114 in the second subset 172 intersect a respective inner circumferential wall 174. In some embodiments, the ratio of the radial length (the length from the outer radius at the open end to the closed end) corresponding to the second deepest troughs 170 and the radial length corresponding to the deepest troughs 172 is between 0.4 and 0.6, and in some of these embodiments, the ratio is about 0.5.

Referring to FIG. 8, the particulate filter can further comprise an inner longitudinal end cap 125 that contactingly covers one longitudinal end of the common interior cavity 120. In some embodiments the inner longitudinal end cap 125 is comprised of porous ceramic; in other embodiments, the inner longitudinal end cap 125 is comprised of a non-porous material that inhibits the flow of gas therethrough. In some embodiments, the ratio of the radial length corresponding to the second deepest troughs and the radial length corresponding to the deepest troughs is between 0.4 and 0.6, and in some of these embodiments, the ratio is about 0.5. In some embodiments, the ratio of the radial length corresponding to the third deepest troughs and the radial length corresponding to the second deepest trough is between 0.4 and 0.6, and in some of these embodiments, the ratio is about 0.5.

As seen in FIG. 7, the outer surface 110 of each trough 106 defines a respective outer cavity 130, wherein the first and second subsets 170, 172 of troughs 106 have respective first and second groups 175, 176 of outer cavities 130. As seen in the embodiment shown in FIG. 9, the particulate filter can further comprise an outer longitudinal end cap 135 that contactingly covers one longitudinal end of the outer cavities 130. In some embodiments the outer longitudinal end cap 135 is comprised of porous ceramic; in other embodiments, the outer longitudinal end cap 135 is comprised of a non-porous material that inhibits the flow of gas therethrough.

Figure 10:
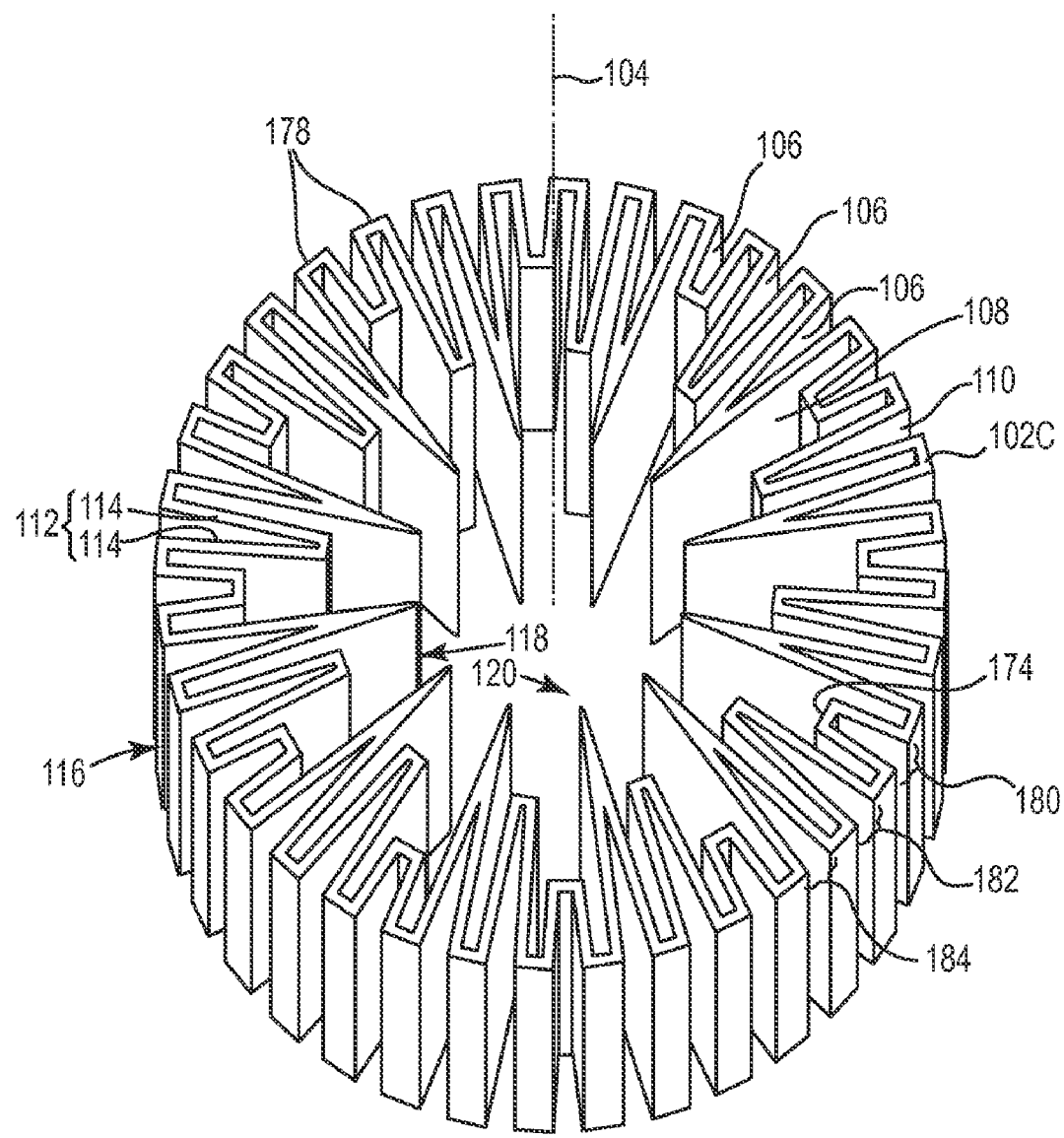
FIG. 10 is an isometric schematic view of yet another embodiment of a filter body disclosed herein.

FIG. 10 illustrates yet another embodiment of the particulate filters disclosed herein. The particulate filter comprises a ceramic cylindrical filter body 102C having a central longitudinal axis 104, the filter body 102C comprising a plurality of adjacent troughs 106 circumferentially arranged around the longitudinal axis 104, each trough 106 having an inner surface 108 and an outer surface 110, each trough 106 comprising a pair 112 of walls 114 extending generally radially, each trough 106 having an open end 116 and a closed end 118 disposed opposite the open end 116, the closed end 118 being disposed radially inward of the open end 116, wherein at the open ends 116 of the troughs 106 the walls 114 of immediately adjacent troughs are joined, the outer surface 110 of the troughs 106 defining a common interior cavity 120. In this embodiment, the troughs 106 are spaced away from the longitudinal axis 104. The filter body 102C further comprises a plurality of outer circumferential walls 178, extending generally circumferentially and joining immediately adjacent walls 114 of immediately adjacent troughs 106 at respective open ends 116.

As seen in FIG. 10, the troughs 106 comprise first, second, and third subsets 180, 182, 184 of troughs 106, the closed ends 118 of the troughs 106 of the first subset 180 being disposed farther away from the central longitudinal axis 104 than the closed ends 118 of the troughs 106 of the second subset 182, and the closed ends 118 of the troughs 106 of the third subset 184 being disposed radially intermediate the closed ends 118 of the troughs 106 of the first and second subsets 180, 182. In the first subset 180 of troughs, the troughs 106 each comprise a respective inner circumferential wall 174 disposed at the closed ends 118, the inner circumferential walls 174 extending generally circumferentially, wherein each pair 112 of walls 114 in the first subset 180 intersect a respective inner circumferential wall 174. In the second and third subsets 182, 184 of troughs 106, each of the pairs 112 of walls 114 intersect at respective closed ends 118, and the walls 114 in the second and third subsets 182, 184 of troughs 106 are disposed in a V-shape. In some embodiments, the ratio of the radial length (the length from the outer radius at the open end to the closed end) corresponding to the second deepest troughs 182 and the radial length corresponding to the deepest troughs 184 is between 0.4 and 0.6, and in some of these embodiments, the ratio is about 0.5. In some embodiments, the ratio of the radial length corresponding to the third deepest troughs 180 and the radial length corresponding to the second deepest trough 182 is between 0.4 and 0.6, and in some of these embodiments, the ratio is about 0.5.

Figure 11:
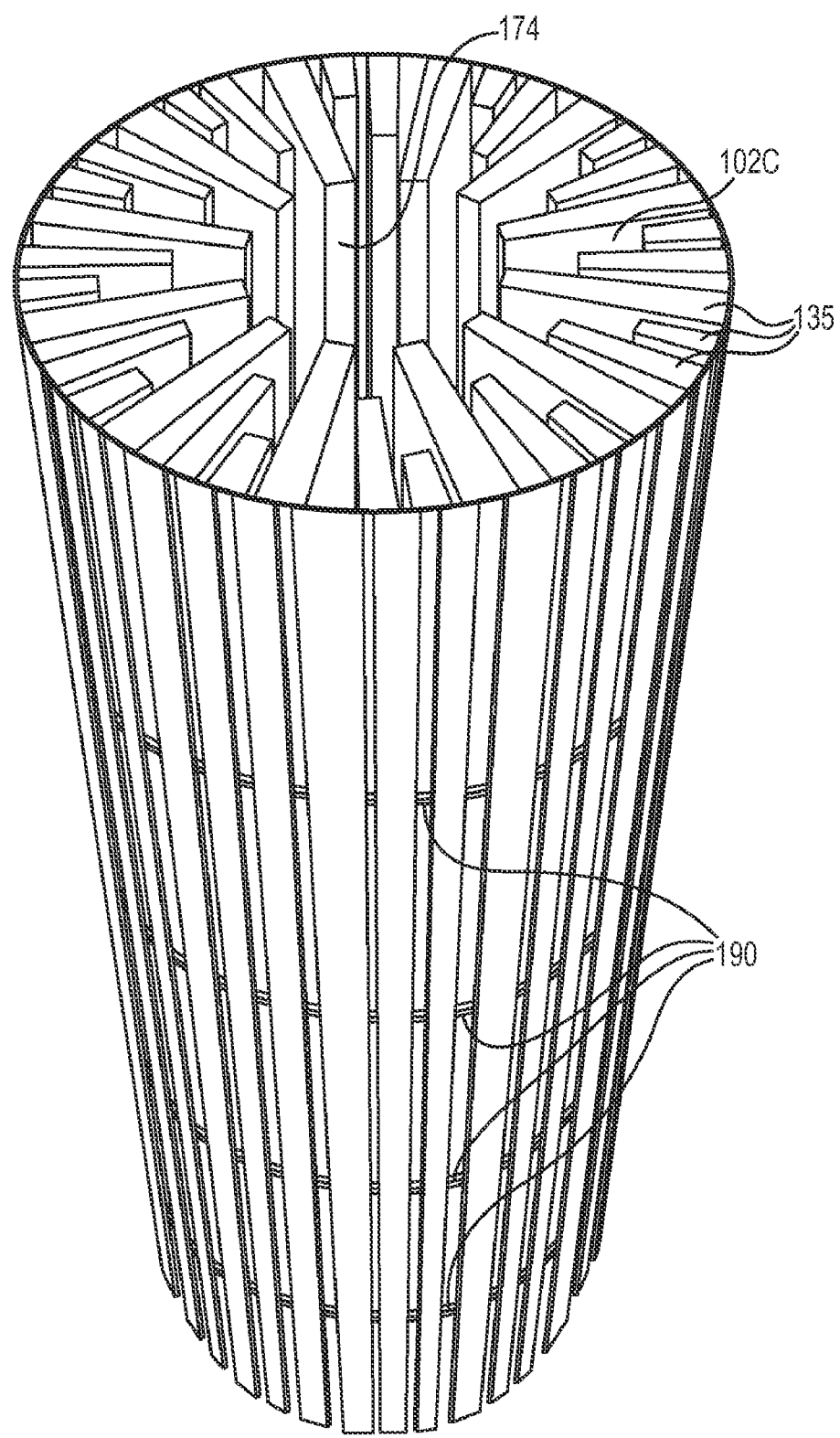
FIG. 11 is an isometric schematic view of still another embodiment of a filter body disclosed herein showing a capped end.

FIG. 11 illustrates yet another embodiment of the particulate filters disclosed herein, similar to the embodiment of FIG. 10 but in the first, second and third subsets 180, 182, 184 of troughs 106, the troughs 106 each comprise a respective inner circumferential wall 174 disposed at the closed ends 118, the inner circumferential walls 174 extending generally circumferentially, wherein each pair 112 of walls 114 in the first, second and third subset 180, 182, 184 intersect a respective inner circumferential wall 174. A plurality of outer longitudinal end caps 135 are shown in FIG. 11 which cover the respective outer cavities 130 (not shown) at one end of the filter body 102C, the interior cavity 120 being open at that end. Ribs or support walls 190 are provided as circumferential supports at spaced apart longitudinal locations along the length of the filter body.

Referring to FIGS. 1-11, the walls 114 at the open ends 116 of the troughs 106 in these embodiments are disposed along straight longitudinal lines.

Figure 12:
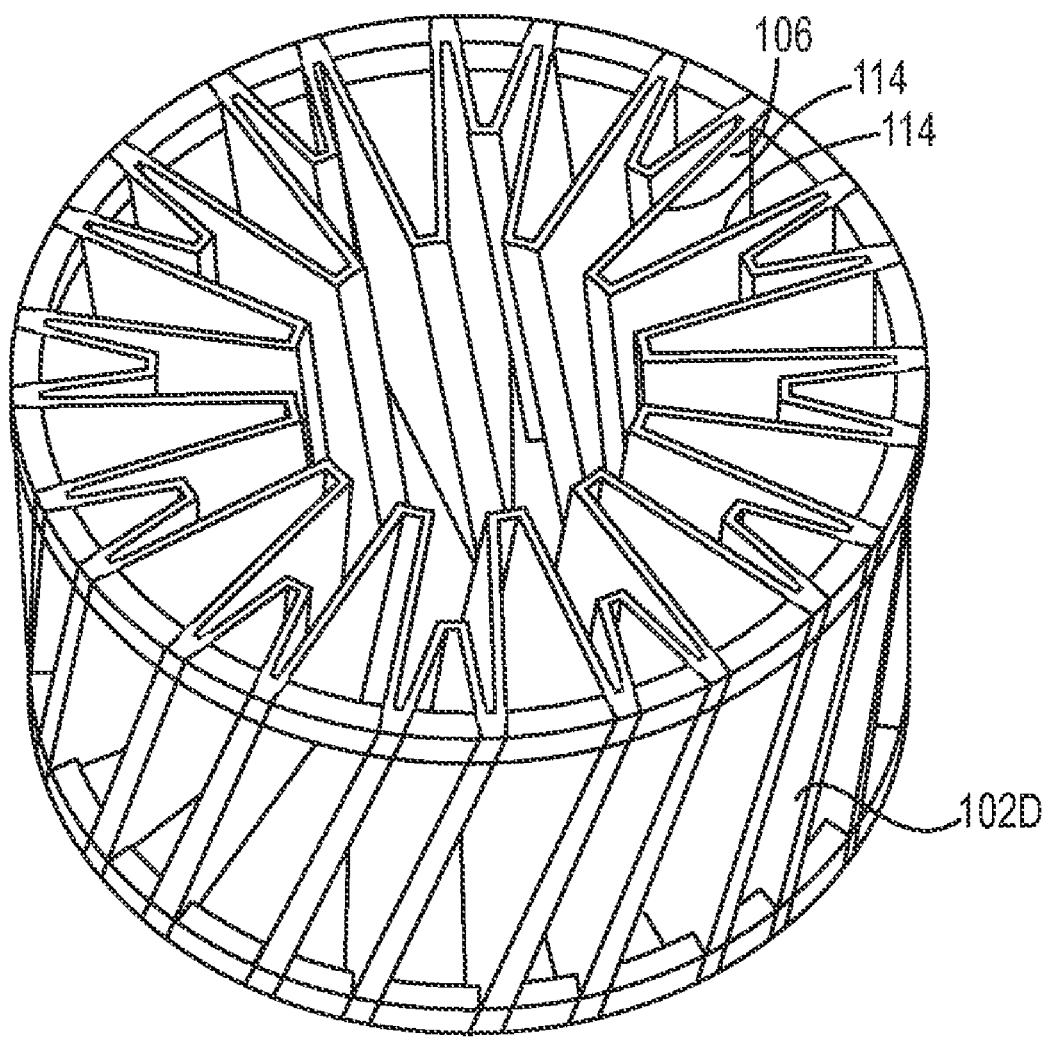
FIG. 12 is an isometric schematic view of yet another embodiment of an uncapped filter body disclosed herein.
Figures 13, 13A:
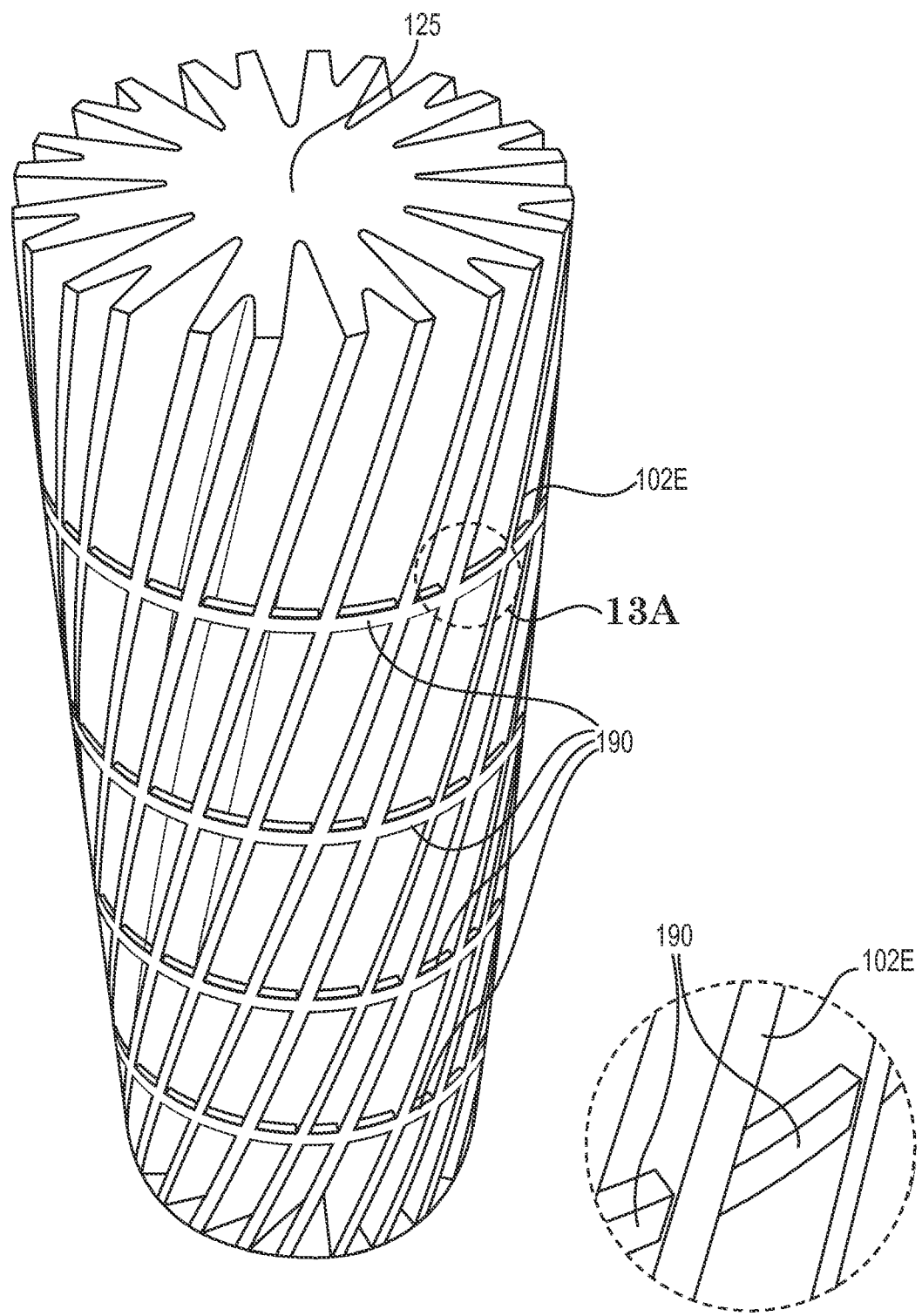
FIG. 13 is an isometric schematic view of still another filter element with a capped end as disclosed herein.
FIG. 13A is a close-up view of a portion of FIG. 13 illustrating ribs or support walls provided as circumferential supports at spaced apart longitudinal locations along the length of the filter body, shown recessed from the outermost diameter of the outer peripheral wall.
Figure 14:
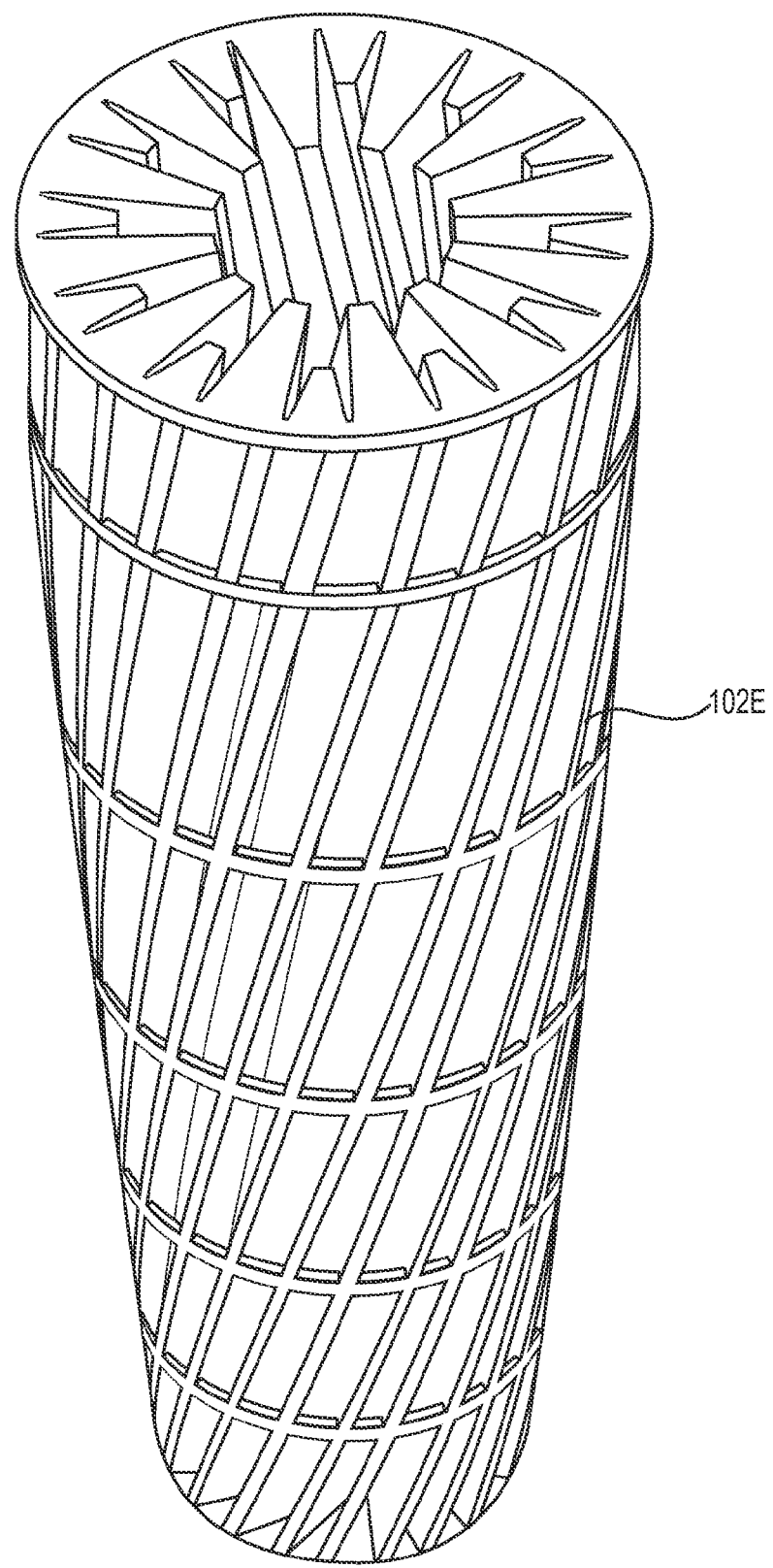
FIG. 14 is an isometric schematic view of the filter element of FIG. 13 showing the opposite end capped.

FIGS. 12-14 show another embodiment, similar to the embodiment shown in FIGS. 7-9, but the walls 114 of the troughs 106 vary longitudinally to form a longitudinal spiral configuration. FIG. 12 shows a filter body 102D; in some embodiments, the ratio of the radial length (the length from the outer radius at the open end to the closed end) corresponding to the second deepest troughs and the radial length corresponding to the deepest troughs is between 0.4 and 0.6, and in some of these embodiments, the ratio is about 0.5. FIG. 13 shows an inner longitudinal end cap 125 disposed at one end of the filter body 102. FIG. 14 shows an outer longitudinal end cap 135 disposed at one end of the filter body 102E.

Figure 15:
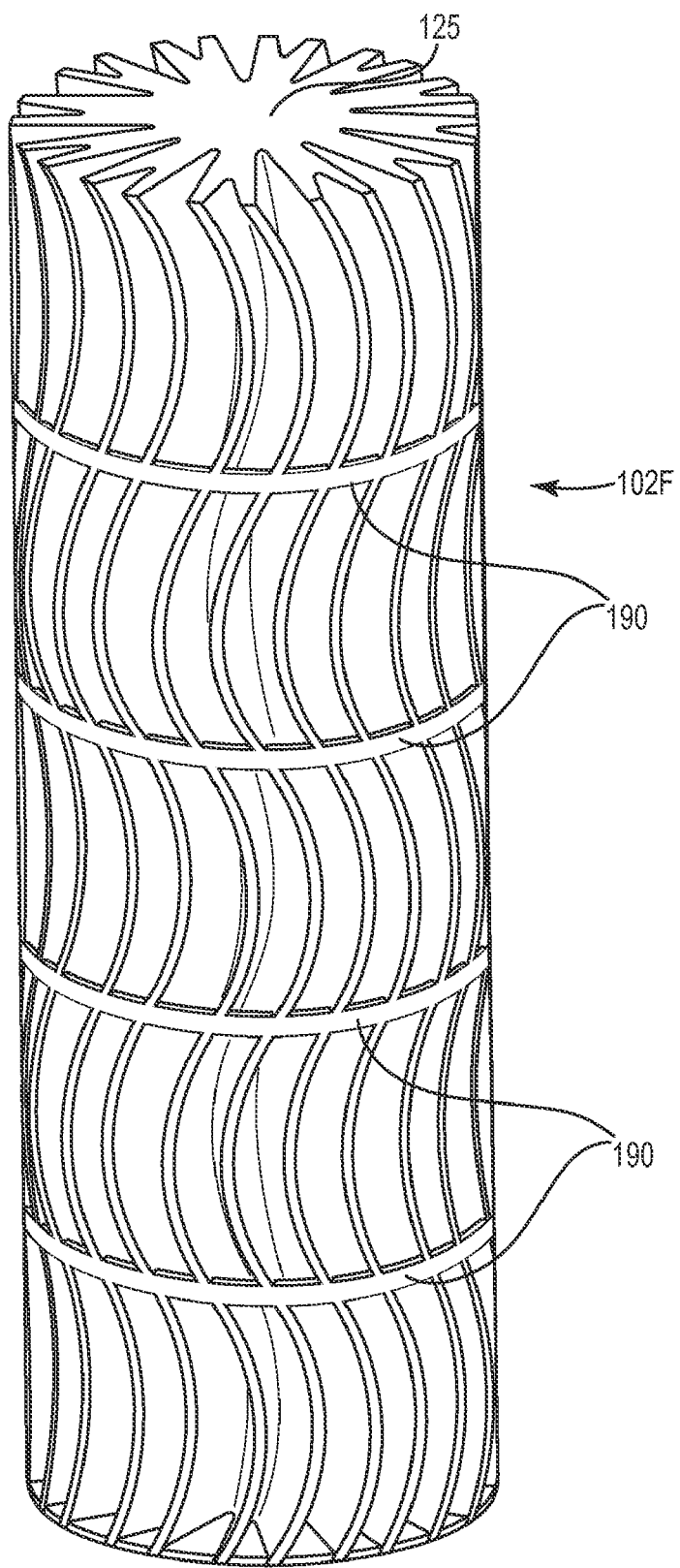
FIG. 15 is an isometric schematic view of yet another filter with capped ends as disclosed herein.

FIG. 15 shows yet another embodiment of a filter body 102F with walls 114 of the troughs 106 varying longitudinally to form a longitudinal wavy or sinusoidal configuration.

Thus, the walls 114 at the open ends 116 of the troughs 106 can be disposed along curvy longitudinal lines, or along sinusoidal longitudinal lines.

Figure 16:
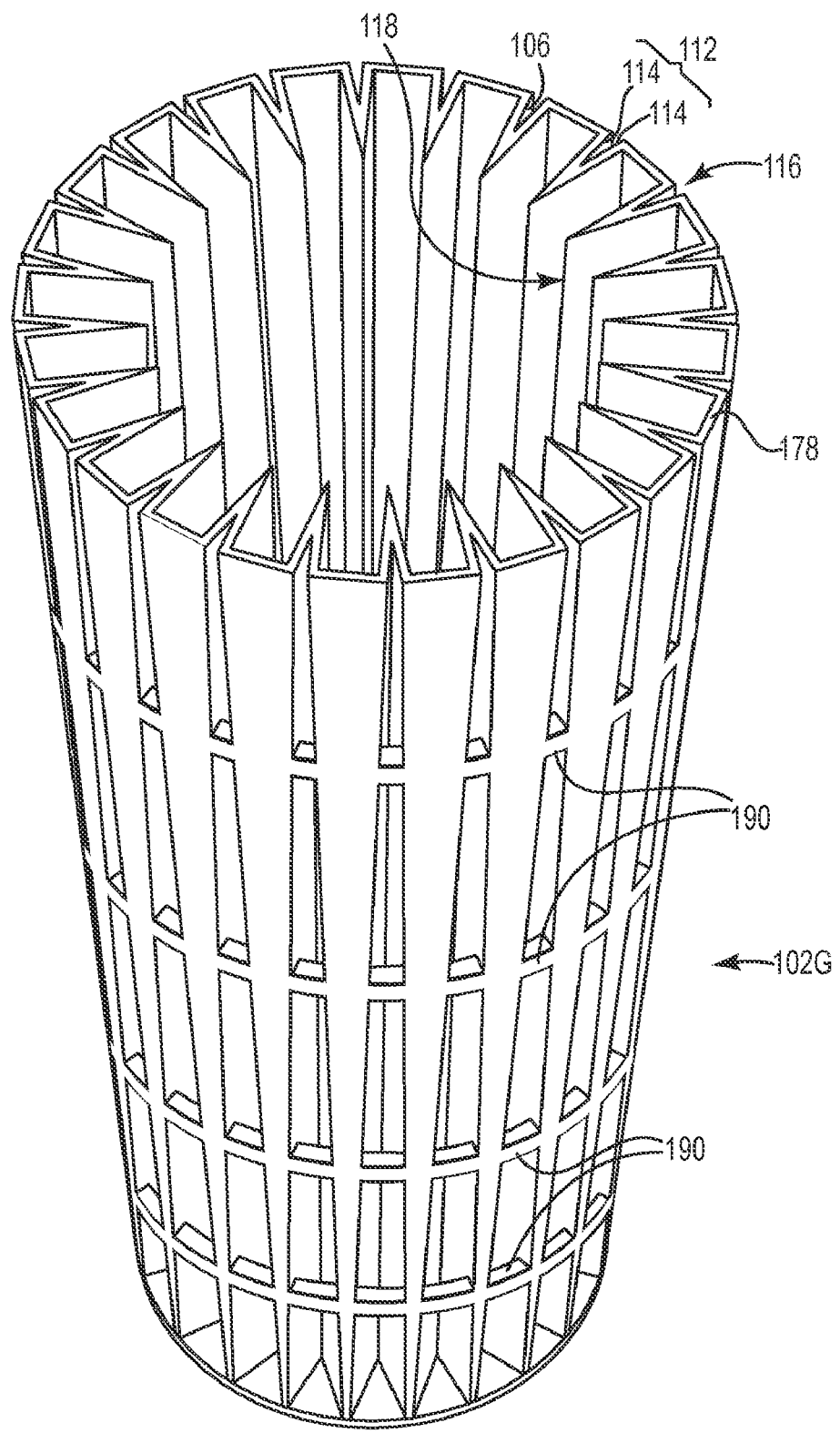
FIG. 16 is an isometric schematic view of still another filter with an uncapped end, as disclosed herein.
Figure 17:
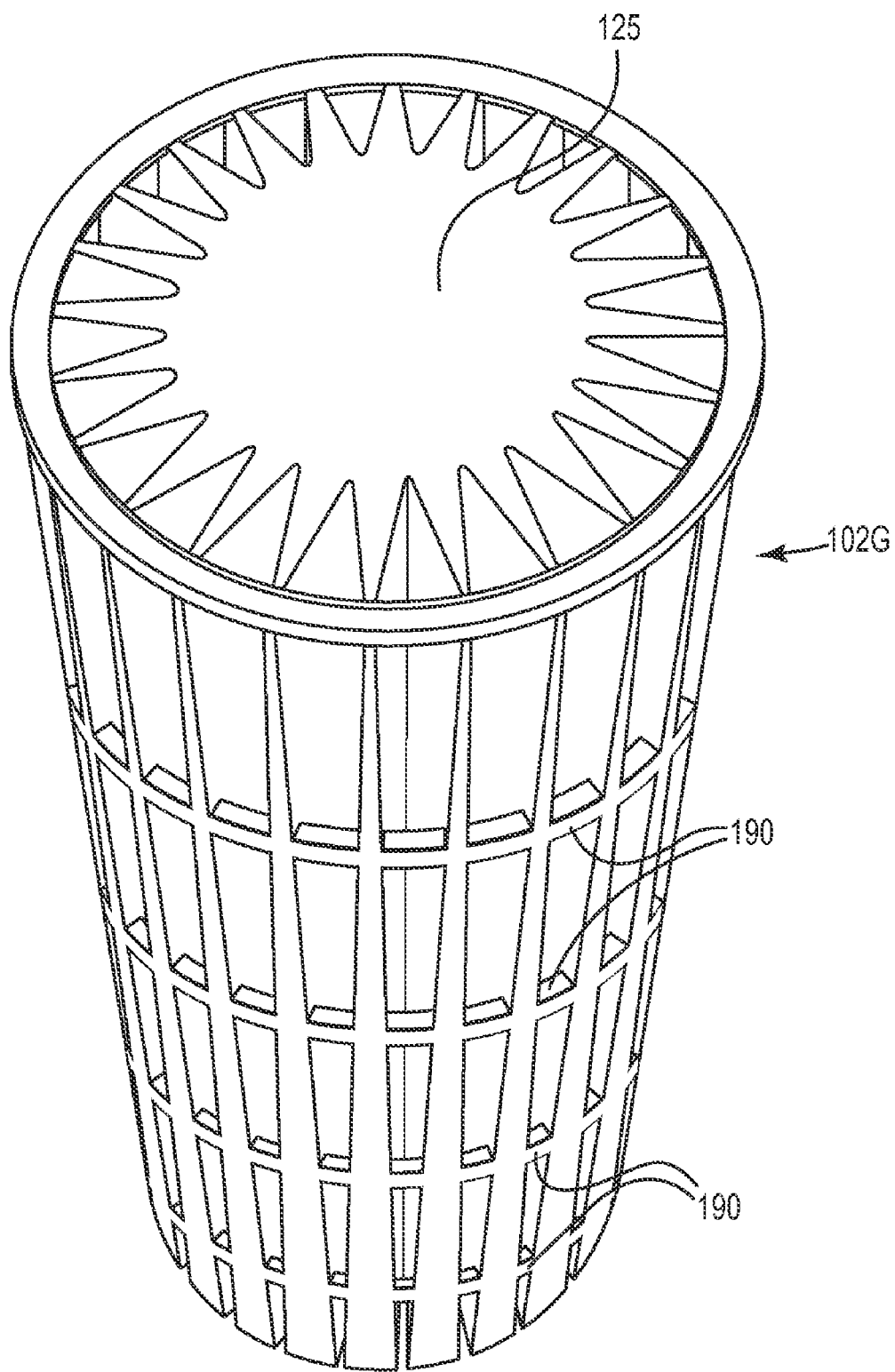
FIG. 17 is an isometric schematic view of the filter of FIG. 16 showing an opposite end capped.

FIGS. 16-17 show still another embodiment wherein the walls 114 of each trough 106 are disposed farther away from each other at one longitudinal end of the filter body 102G as compared to an opposite longitudinal end of the filter body 102G; at the one end, the walls 114 of immediately adjacent troughs 106 intersect with respective outer circumferential walls 178 disposed at the open ends 118, the outer circumferential walls 178 extending generally circumferentially, wherein each pair 112 of walls 114 at the one end intersect a respective outer circumferential wall 178; at the opposite end, the walls 114 at the closed end 118 intersect and are disposed in a V-shape The outer circumferential walls 178 are configured to form a longitudinal taper which is wider at one end and narrower at the opposite end. FIG. 17 shows the opposite end capped with end cap 125.

As illustrated, for example, by the embodiments of FIGS. 11-17, the filter body disclosed herein can include one or more circumferential support walls 190 extending between the respective pairs 112 of walls 114 of the one or more troughs 106. That is, one or more troughs 106 of the filter body 102 can further comprise a circumferential support wall 190 extending between respective pairs 112 of walls 114 of the one or more troughs 106. The circumferential support wall or walls 190 can extend substantially around a circumference of the filter body 102, and circumferential support walls 190 can be disposed at more than one longitudinal location along the length L of the filter body. In some embodiments, the circumferential support wall 190 is comprised of porous ceramic. In some embodiments, one or more circumferential support wall or walls 190 are configured to allow flow of gas longitudinally within a particular outer cavity 130 without passing through a porous wall.

Figure 18:
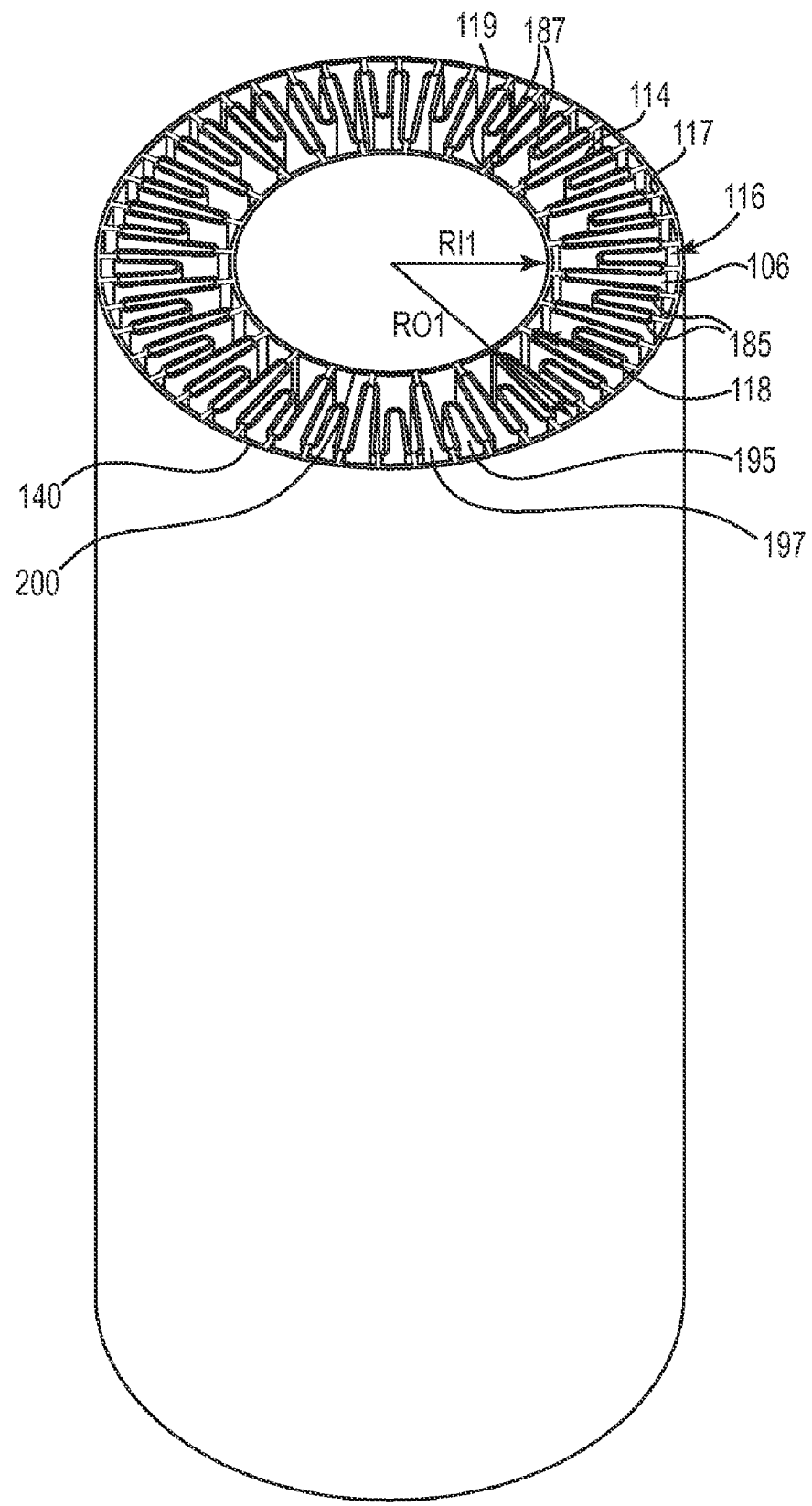
FIG. 18 is an isometric schematic view of another embodiment of a filter disclosed herein.

FIG. 18 shows another embodiment wherein the walls 114 of each trough 106 have rounded surfaces 185 proximate to their open end 116 and rounded surfaces 187 proximate to their closed end 118. As shown in FIG. 18, the troughs 106 comprise first 195 and second 197 subsets of troughs, the closed ends 118 of the troughs 106 of the first subset 195 being disposed farther away from the central longitudinal axis 104 than the closed ends 118 of the troughs 106 of the second subset 197. In each subset of troughs, the rounded surfaces 185 proximate to open ends 116 round toward adjacent troughs, such that adjacent trough walls converge to form one common radially extending wall segment 117 between the outermost part of rounded surfaces 185 and outer radius RO1. In the second subset 197 of troughs, the rounded surfaces 187 proximate to closed ends 118 round toward each other, such that the trough walls converge to form one common radially extending wall segment 119 between the innermost part of rounded surfaces 187 and inner radius RI1. As shown in FIG. 18, the filter additionally includes an outer peripheral wall 140 having a radius that is approximately equal to RO1 and an inner peripheral wall 200 having an radius that is approximately equal to RI1, such that the outermost portion of the walls 114 of each trough contact outer peripheral wall 140 and the innermost portion of walls 114 of the second subset 197 contact inner peripheral wall 200.

Figure 19:
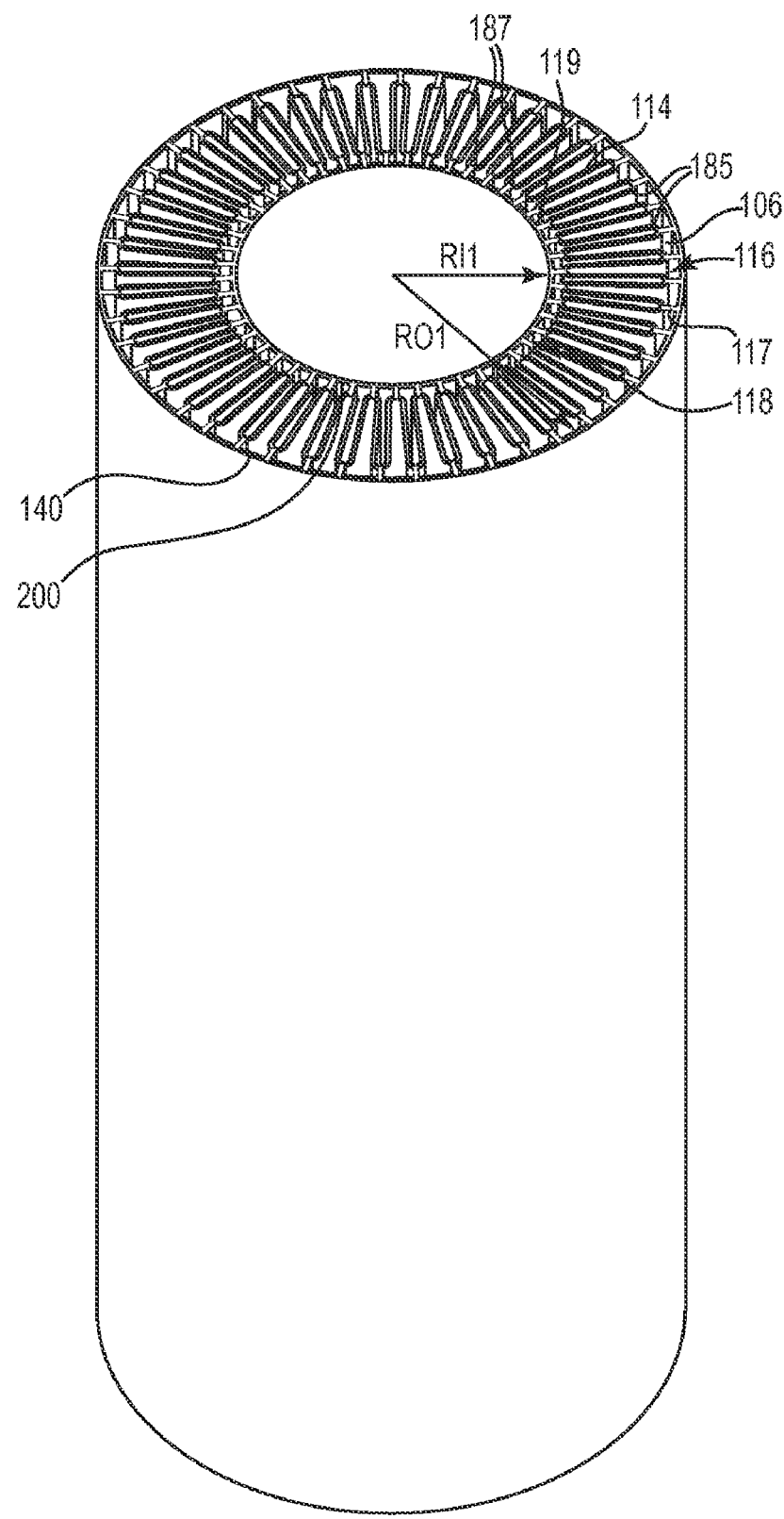
FIG. 19 is an isomeric schematic view of yet another embodiment of a filter disclosed herein.

FIG. 19 shows an embodiment that is similar to the embodiment shown in FIG. 18, except the closed ends 118 of all the troughs 106 are disposed at approximately the same distance away from the central longitudinal axis 104 and the rounded surfaces 187 proximate to closed ends 118 of each trough are rounded toward each other such that the trough walls 114 of each trough converge to form one common radially extending wall segment 119 between the innermost part of rounded surfaces 187 and inner radius RI1.

Figure 20:
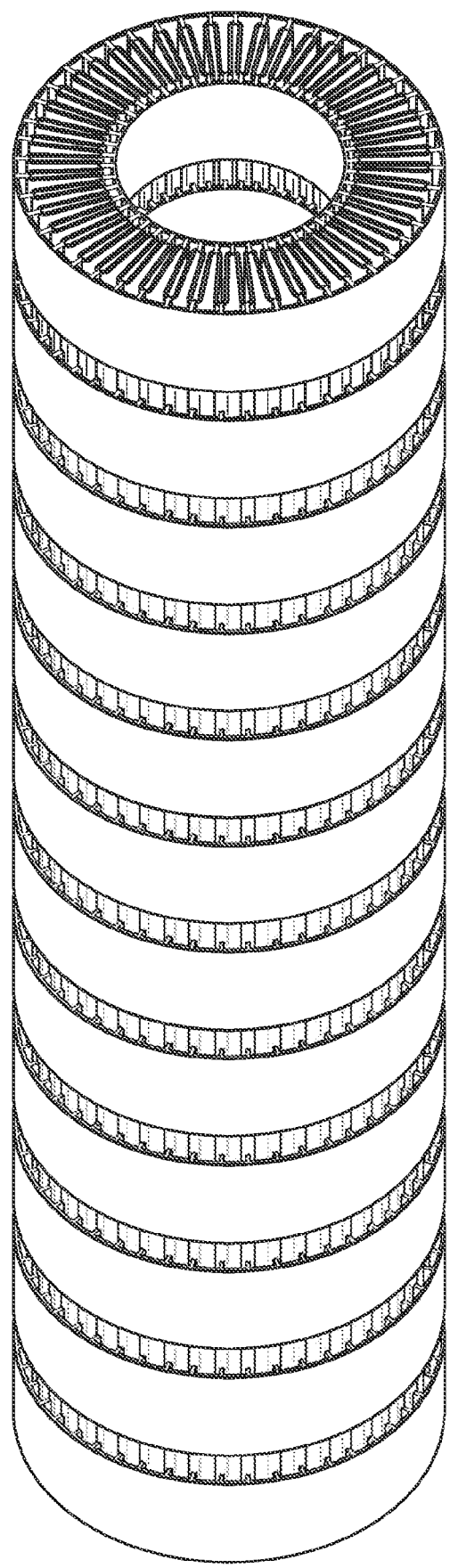
FIG. 20 is an isomeric schematic view of still yet another embodiment of a filter disclosed herein.

FIG. 20 shows an embodiment that is similar to the embodiment shown in FIG. 19, except outer peripheral wall 140 and inner peripheral wall 200 extend along only portions of the axial length of the filter. Specifically, outer peripheral wall 140 and inner peripheral wall 200 repeatedly extend as repeating rings along the axial length of the filter.

Filter bodies can be manufactured by one or methods such as extrusion, 3-D printing, folding and bonding methods using sheets of green ceramic, injection molding or slip casting.

Filter bodies such as those depicted in FIGS. 1-4, 6-15 and 18-19, for example, can be advantageously manufactured by extrusion. The shapes can be extruded vertically, horizontally, or any angle in-between; optionally they can be rapidly stiffened at the die exit or they can be extruded from the die onto a mandrel to avoid shape collapse. The dies can be patterned to allow the shapes to be extruded using methods known to those skilled in the art, including, but not limited to, direct metal laser sintering (DMLS).

Embodiments of the filters or filter bodies of the present disclosure can also be made by slip/pressure casting. An inner mold is made with very low mass to avoid lengthy mold burn out/sublimation schedules or cost. For pressure casting the mold may need significant structural rigidity, but should have provisions for fluid escape, such as a porous surface layer with increasingly larger pores or porosity amount toward the center of the mold. For slip casting, the mold could be fairly uniform in porosity, but the slip vehicle should wet the mold. The slip casting mold could have a graded porosity structure as well. Both molds could be hollow or be mostly hollow with strengthening/supporting ribs. The inner mold could be supported on a mandrel, with provisions for slip vehicle escape to further lower the amount of material in the mold.

Embodiments of the filters of the present disclosure can also be made by injection molding. For injection molding the inner mold should have some taper to the inner diameter and the interior part of the troughs should also taper so that the injected part can be removed easily.

Injection molding a polymer mold for pressure or slip casing can be an efficient method. Injection molding of ceramics can be costly as the ceramic powder abrades the die and causes short die life, however most polymer/organic materials do not wear the die as much as a ceramic filled material and the polymer mold product usually has more elasticity/plasticity, leading to higher yields and the possibility of more intricate designs and features.

Embodiments of the present disclosure are solid but porous wall flow ceramic exhaust filters that can provide substantially more cell walls oriented in a generally radial direction than cell walls oriented in a generally circumferential direction. Embodiments of the filters of the present disclosure can provide more exhaust gas flow both in the radial/circumferential directions than regular square cell/rectangular cell honeycomb filters. Embodiments of the filter structures of the present disclosure can have more radial/circumferential compliance than known honeycomb structures, particularly square cell honeycombs.

It is believed that embodiments of the present disclosure could provide higher thermal shock resistance and/or allow the use of materials with higher CTE and or E-modulus (or even higher thermal conductivity or heat capacity or higher melting temperature) and still provide acceptable levels of thermal shock resistance, due to the compliant nature of the radial wall flow structures of the present disclosure. If the filter body is comprised of a micro cracked ceramic, such ceramic material can have less micro-cracking and more strength than known honeycomb structures. Higher temperature/higher expansion materials may allow the use of thinner filtering walls for a rapid heating rate, such as for a gasoline particulate filter application or for a given soot load/maximum temperature (regeneration temperature) for particulate filters like diesel particulate filters DPF or gasoline particulate filters GPF, and hence embodiments with such thermal shock resistance and thin walls could have lower back pressure. For particulate filters of the present disclosure, for example DPF applications, the exhaust gas flow in these radial/axial flow filters will be substantially different when compared to straight channel, uniform cross-section channel, extruded honeycomb filters. There will be substantially more radial exhaust flow. Without needing to be bound by any theory, we believe that such radial flow alters the heating and regeneration temperature distributions, and in embodiments there will be more heat pushed to the outer radius of the filter and less down the axial direction, and coupled with the compliance, high thermal shock resistance can result.

What is claimed is:

1. A particulate filter comprising a ceramic cylindrical filter body having a central longitudinal axis, the filter body comprising a plurality of adjacent troughs circumferentially arranged around the longitudinal axis, each trough having an inner surface and an outer surface, each trough comprising a pair of walls extending generally radially, each trough having an open end and a closed end disposed opposite the open end, the closed end being disposed radially inward of the open end; and wherein the walls of each trough have rounded surfaces proximate to their open end and rounded surfaces proximate to their closed end and wherein the rounded surfaces proximate to said open end round toward adjacent troughs, such that adjacent trough walls converge to form a common radially extending wall segment between the outermost part of rounded surfaces proximate to said open end and an outer radius of the troughs; and wherein the troughs comprise first and second subsets of troughs, the closed ends of the troughs of the first subset being disposed farther away from the central longitudinal axis than the closed ends of the troughs of the second subset.

2. The particulate filter of claim 1 wherein said rounded surfaces proximate to closed ends round toward each other, such that the trough walls converge to form one common radially extending wall segment between the innermost part of rounded surfaces and inner radius.

3. The particulate filter of claim 1 wherein each of the common radially extending wall segments between the outermost part of rounded surfaces proximate to said open end and an outer radius of the troughs terminate at substantially the same outer radius.

4. The particulate filter of claim 2 wherein each of the common radially extending wall segments between the innermost part of rounded surfaces and inner radius terminate at substantially the same inner radius.

5. The particulate filter of claim 1 wherein, in the second subset of troughs, the rounded surfaces proximate to closed ends round toward each other, such that the trough walls converge to form one common radially extending wall segment between the innermost part of rounded surfaces and inner radius.

6. The particulate filter of claim 1 wherein the radial positions of the walls at the open ends of the troughs vary longitudinally to form a longitudinal taper.

7. The particulate filter of claim 1 wherein the walls of the troughs vary longitudinally.

8. The particulate filter of claim 1 wherein the walls of the troughs vary longitudinally to form a longitudinal spiral configuration.

9. The particulate filter of claim 1 wherein the walls of the troughs vary longitudinally to form a longitudinal wavy configuration.

10. The particulate filter of claim 1 wherein walls of the troughs define a common interior cavity and the filter further comprises an inner longitudinal end cap that contactingly covers one longitudinal end of the common interior cavity.

11. The particulate filter of claim 1 wherein the walls of the troughs defines respective outer cavities and filter further comprises an outer longitudinal end cap that contactingly covers one longitudinal end of the outer cavities.

12. The particulate filter of claim 1 wherein the inner surface of each trough defines a respective outer cavity, and wherein one or more troughs of the filter body further comprises a circumferential support wall extending between the respective pair of walls of the one or more troughs.

13. The particulate filter of claim 1 wherein the filter further comprises an outer peripheral wall surrounding the troughs.

14. The particulate filter of claim 13 wherein the filter further comprises an inner peripheral wall surrounded by the troughs.

15. The particulate filter of claim 1 wherein the filter further comprises an outer peripheral wall that extends along only portions of the axial length of the filter.

16. The particulate filter of claim 15 wherein the filter further comprises an inner peripheral wall that extends along only portions of the axial length of the filter.

17. The particulate filter of claim 15 wherein the outer peripheral wall extends as repeating rings along the axial length of the filter.

18. The particulate filter of claim 17 wherein the inner peripheral wall extends as repeating rings along the axial length of the filter.

* * * * *